United States Patent
Kuchman (10) Patent No.: US 7,212,489 B2
(45) Date of Patent: May 1, 2007

(54) OPTICAL DISC AND METHOD OF PROTECTING SAME

(75) Inventor: Todd J. Kuchman, Highlands Ranch, CO (US)

(73) Assignee: Scratch-Less Disc Industries, LLC, Denver, CO (US)

( * ) Notice: Subject to any disclaimer, the term of this patent is extended or adjusted under 35 U.S.C. 154(b) by 501 days.

(21) Appl. No.: 10/717,636

(22) Filed: Nov. 21, 2003

(65) Prior Publication Data

US 2004/0103424 A1  May 27, 2004

Related U.S. Application Data

(63) Continuation of application No. 09/964,711, filed on Sep. 27, 2001, now Pat. No. 6,680,898.

(60) Provisional application No. 60/270,434, filed on Feb. 21, 2001.

(51) Int. Cl.
G11B 7/00 (2006.01)

(52) U.S. Cl. .............................. 369/275.4; 369/275.5; 369/47.1; 369/53.21

(58) Field of Classification Search .............. None
See application file for complete search history.

(56) References Cited

U.S. PATENT DOCUMENTS

| 2,631,859 | A | 3/1953 | Ellsworth |
| 3,787,274 | A | 1/1974 | Genma ...................... 428/64.2 |
| 3,931,457 | A | 1/1976 | Mes ........................... 386/95 |
| 3,931,459 | A | 1/1976 | Korpel .................. 369/109.01 |
| 4,038,524 | A | 7/1977 | Puech et al. ......... 235/61.12 N |
| 4,074,282 | A | 2/1978 | Balas, Jr. et al. ........... 346/135 |
| 4,111,698 | A | 9/1978 | Sato .............................. 96/79 |
| 4,113,492 | A | 9/1978 | Sato et al. ..................... 96/67 |
| 4,175,145 | A | 11/1979 | Fechter ....................... 427/240 |
| 4,204,686 | A | 5/1980 | Church ....................... 369/291 |
| 4,326,282 | A | 4/1982 | Verboom et al. ........ 369/47.28 |
| 4,336,545 | A | 6/1982 | Howe et al. .......... 346/135.1 |
| 4,353,767 | A | 10/1982 | Wilkinson .................. 156/245 |
| 4,371,954 | A | 2/1983 | Cornet ....................... 365/126 |
| 4,462,036 | A | 7/1984 | Leonard et al. ............. 346/137 |

(Continued)

FOREIGN PATENT DOCUMENTS

DE  28 39 359  3/1980

(Continued)

*Primary Examiner*—Muhammad Edun
(74) *Attorney, Agent, or Firm*—Pillsbury Winthrop Shaw Pittman, LLP (57) ABSTRACT

An optical disc for storage and retrieval of digital data, and a system and method for protecting the optical disc is disclosed. The optical disc has projections or embossments on one or both surfaces. When the optical disc is placed on a substantially flat surface such as a tabletop or a desktop, the projections act as pedestals that elevate the optical disc above the flat surface. The resulting gap or clearance helps prevent damage to the optical disc caused by contaminants on the flat surface or by defects in the flat surface. The projections are sized to provide adequate clearance between the disc and the flat surface, while minimizing interference between the projections and components of optical disc readers and drives. The optical disc may also include one or more depressions that are sized and configured to receive projections from another disc, which facilitates stacking of the optical discs.

18 Claims, 5 Drawing Sheets

U.S. PATENT DOCUMENTS

| | | | |
|---|---|---|---|
| 4,519,064 A | 5/1985 | Takagi et al. | 369/275.3 |
| 4,536,869 A | 8/1985 | Chandler et al. | 369/287 |
| 4,546,464 A | 10/1985 | Inoue et al. | 369/280 |
| 4,633,458 A | 12/1986 | Tiefensee | 369/275 |
| 4,719,137 A | 1/1988 | Ohta et al. | 428/67 |
| 4,737,408 A | 4/1988 | Kuwahara et al. | 428/335 |
| 4,808,456 A | 2/1989 | Yamada et al. | 428/65 |
| 4,811,326 A | 3/1989 | Gerber | 369/100 |
| 4,891,798 A | 1/1990 | Shinkai | 369/45 |
| 4,961,077 A | 10/1990 | Wilson et al. | 347/262 |
| 5,128,922 A | 7/1992 | Inui et al. | 369/280 |
| 5,247,495 A | 9/1993 | Birukawa et al. | 369/13.35 |
| 5,513,169 A | 4/1996 | Fite et al. | 369/272 |
| 5,987,003 A | 11/1999 | Yokota | 369/280 |
| 6,424,488 B1 | 7/2002 | Misso et al. | 369/98.08 |

FOREIGN PATENT DOCUMENTS

| | | |
|---|---|---|
| DE | 31 27 993 | 2/1983 |
| GB | 473988 | 10/1937 |
| GB | 2 004 404 | 3/1978 |
| JP | 58-48089 | 3/1983 |
| JP | 9-320111 | 12/1997 |
| JP | 2001-23238 | 1/2001 |

OPTICAL DISC AND METHOD OF PROTECTING SAME

CROSS-REFERENCE TO RELATED APPLICATION

This application claims the benefit of U.S. Provisional Application No. 60/270,434, filed Feb. 21, 2001, and U.S. application Ser. No. 09/964,711, filed Sep. 22, 2001, now U.S. Pat. No. 6,680,898.

BACKGROUND OF THE INVENTION

1. Field of the Invention

The present invention relates to an optical disc for storage and retrieval of digital data and to a method of protecting the optical disc.

2. Discussion

Optical discs, such as compact discs (CDs) and digital videodiscs (DVDs), have become the accepted medium for storing and retrieving large amounts of digital information (data). Standard CDs and DVDs have the same physical dimensions (12 cm OD, 1.2 mm thickness), but differ primarily in the amount of data that each can hold. A standard CD can store up to about 783 megabytes of audio programming, while DVDs can hold between about 4.38 gigabytes (single-sided/single-layer DVD) and about 15.9 gigabytes (double-sided/dual-layer DVD) of multimedia programming (photographs, video, audio, etc.). Other optical storage discs include read only memory compact discs (CD-ROMs), recordable compact discs (CD-R), recordable DVDs (DVD-R), and rewritable compact discs (CD-RW). Though physically similar to audio CDs, CD-ROMs, CD-Rs and CD-RWs can store slightly less data (i.e., less than about 700 megabytes) because a fraction of their respective storage capacities are used by a file system and data associated with enhanced error correction.

Optical discs owe their large storage capacity to the way they represent digital data. With CDs and single-layer DVDs, digitized (binary) data are encoded on the discs as a sequence of microscopic pits separated by smooth areas (lands) that define a continuous track that spirals outward from the center of the disc. Adjacent tracks on CDs are 1600 nm apart, and the minimum pit length is 830 nm. DVD's achieve their greater storage capacity, in part, by shrinking the distance between adjacent tracks (740 nm) and by decreasing the minimum pit length (400–440 nm). Recordable compact discs and rewritable compact discs employ similar data encoding, except that the "pits" on CD-Rs and CD-RWs are replaced by "dark" spots formed, respectively, on a light-sensitive organic dye layer or light-excitable crystal layer.

Optical disc readers (CD or DVD players, CD-ROM, CD-R or CR-RW drives, etc.) retrieve data using a laser pickup assembly and a tracking system. During playback, the laser pickup assembly focuses a laser beam on the spinning optical disc, while the tracking system moves the laser pickup assembly outward from the center of the disc. The optical reader adjusts the angular speed of the disc during data retrieval so that pits and lands of a single track stream past the laser beam at constant linear velocity. The optical pickup includes a detector (e.g., photodiode array) which detects any light reflected by the optical disc. Laser light hitting a land reflects at a higher intensity than laser light hitting a pit (or dark spot) which scatters the light. The optical disc reader translates these temporal changes in detected light intensity into a stream of binary data.

Optical discs have relatively simple, but elegant construction. Digital videodiscs, for example, are composed of one or more layers of plastic (e.g., optical grade polycarbonate) that are individually formed by injection molding. One surface of each layer contains the encoded data as a spiral track of microscopic pits and lands, while another surface is substantially planar. Prior to assembling the layers, DVD manufactures cover the surface containing the pits and lands with a thin metallic layer. The plastic layers that will become the outermost layers of the DVD are coated with semi-reflective gold, while the plastic layers that will become the innermost layers are coated with aluminum. The use of gold allows the laser pickup assembly to focus laser light through the outer layers onto the inner layers of the DVD. Following preparation of the plastic layers, each is coated with acrylic lacquer, pressed together, and cured to form the disc. For single-sided discs, a label is applied onto the non-readable side (i.e., side opposite the polycarbonate layer or layers containing pits and lands). Audio CD and CD-ROMs are made in a similar manner, but comprise a single polycarbonate layer laminated to a metallic film and relatively thin acrylic layer.

Compared to competing technologies such as magnetic storage media, optical discs are mechanically robust and inexpensive. Despite these advantages, however, optical discs can be improved. Although the polycarbonate plastic layer has excellent optical properties and good dimensional stability, it can be scratched during handling, which may compromise data stored on the disc. For example, after removing compact discs from their protective cases, users often place them on comparatively hard flat surfaces, such as a tabletop or desktop, with the polycarbonate or readable side face down (label-side face up). Since optical discs are quite thin, users find it difficult to pickup CDs without dragging them across the tabletop. In doing so, hard contaminants on the surface of the tabletop and any defects in the tabletop surface may scratch, gouge, or scuff the polycarbonate plastic layer. Similarly, users often stack CDs to conserve space. Any dirt particles trapped between individual CDs may also damage the surfaces of individual CDs during handling of the stack. Although the optical properties of polycarbonate and on-disc error correction help reduce the affects of surface scratches, repeated damage to CD surfaces over time may render some data unreadable.

The present invention overcomes, or at least mitigates, one or more of the problems described above.

SUMMARY OF THE INVENTION

The present invention provides an optical disc having projections or embossments on one or both surfaces of the disc. When the optical disc is placed on a generally flat surface such as a tabletop or a desktop, the projections act as pedestals that elevate the bulk of the optical disc above the flat surface. The resulting gap or clearance enables users to grasp and to pick up the optical discs without dragging the discs across the flat surface. Moreover, even if the optical disc is dragged across the tabletop or desktop, the clearance helps prevent damage to the optical disc caused by contaminants on the flat surface or by defects in the flat surface. The projections are sized to provide adequate clearance between the disc and the flat surface, while preventing or reducing interference between the projections and components of optical disc readers and drives. The projections may range in height up to about one mm, i.e., about the thickness of a standard compact disc (CD) or digital videodisc (DVD), but typically the height of the projections is about half (0.6 mm)

or less than the thickness of a standard CD or DVD. In addition, the projections are ordinarily provided at predefined non-data portions of the optical disc—e.g., in the program lead-out region or between the clamping region and the program lead-in region—so that the projections will not disturb data storage or retrieval. Generally, however, the projections may be placed in a disc's data storage (program) area if it lacks encoded digital data. The optical disc may also include one or more depressions that are sized and configured to receive projections from another disc, which facilitates stacking of the optical discs.

The present invention also includes a system and method for protecting an optical disc that is used to store and retrieve digital data. The system includes one or more projections or embossments that may be applied to a surface of the optical disc. The projections are sized and configured to prevent or minimize interference with digital data retrieval and to provide clearance between the surface of the optical disc and a substantially flat surface when the surface of the optical disc is placed on the substantially flat surface. Similarly, the method includes providing one or more projections on at least one surface of the optical disc. Like the inventive system, the projections are sized and configured to prevent interference with digital data retrieval and to provide clearance between the optical disc and the substantially flat surface. The projections may be formed during fabrication of the optical disc (i.e., by injection molding) or may be applied to the surface of the optical disc by bonding techniques.

DETAILED DESCRIPTION

Figure 1:
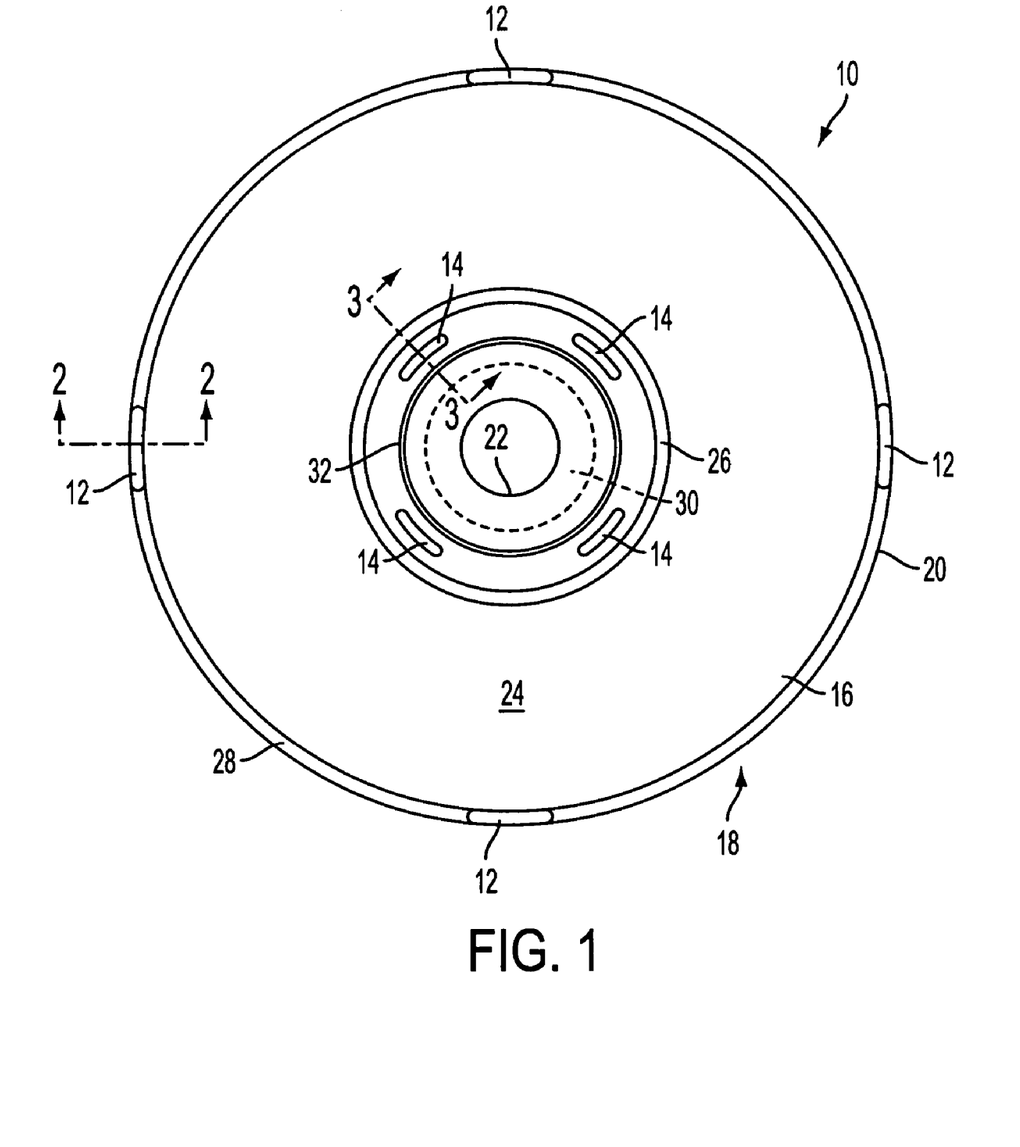
FIG. 1 is a bottom view of an optical disc having projections or embossments for protecting the optical disc surface.

FIG. 1 shows a bottom view of an optical disc 10 having first 12 and second 14 sets of projections or embossments for protecting the optical disc 10 from damage (scratches, gouges, scuff marks, etc.). For clarity, we describe various embodiments of the optical disc 10 in terms of a standard audio compact disc (CD), and to a lesser extent, in terms of a digital videodisc (DVD). However, the disclosed invention is not limited to audio CDs and to DVDs, but applies generally to any optical disc that is used to store and retrieve digital data, including read only memory compact discs (CD-ROMs), recordable compact discs (CD-R), recordable DVDs (DVD-R), rewritable compact discs (CD-RW), high density fluorescent multilayer (FMD) ROM media, and the like.

The optical disc 10 shown in FIG. 1 is comprised of a pair of substantially parallel first 16 and second 18 surfaces. As shown in FIG. 1, the first 16 and second 18 surfaces have substantially circular and concentric outer 20 and inner 22 peripheries, although generally the optical disc's outer periphery may assume any shape. As noted above, digitized (binary) data are encoded on the optical disc 10 as a sequence of microscopic pits (or dark spots) interrupted by smooth areas (lands) that define a continuous track (or concentric tracks) spiraling outward from the center of the disc 10. In the embodiment shown in FIG. 1, the encoded data lies within a data storage (program) area 24 that can be accessed by shining laser light through the substantially transparent first (bottom) surface 16. The data storage area 24 is defined by a lead-in area 26 and a lead-out area 28, which are located adjacent to the inner 22 and outer 20 peripheries of the first surface 16, respectively. For a standard audio CD, the lead-in and lead outer areas begin, respectively, at radii 23 mm and 58 mm, and end at radii 25 mm and 60 mm. The lead-in area 26 typically contains digital silence (no data) in the main channel plus the optical disc's table of contents in the subcode Q-channel; the lead-out area 28 usually contains no data.

As can be seen in FIG. 1, the first 12 and second 14 sets of projections are located in predefined non-data regions of the optical disc 10. Thus, the first set of projections 12 is located on the optical disc's first surface 16 within the lead-out area 28. Similarly, the second set of projections 14 is located on the optical disc's first surface 16 between a clamping region 30 and the lead-in area 26. The clamping region 30 generally refers to a portion of the optical disc 10 that contacts a disc drive mechanism during playback or recording (see FIG. 5). In standard CDs and DVDs, a ridge, which is known as a stacking ring 32, encircles the inner periphery 22 of the optical disc 10 and limits the outer radius of the clamping region 30. In some embodiments, the second set of projections 14 may replace the stacking ring 32.

Each set of projections 12, 14 shown in FIG. 1 is comprised of four discrete and elongated projections 12, 14, although the number of individual projections and their distribution may vary among optical discs. The sets of projections 12, 14 shown in FIG. 1 are evenly distributed within the lead-out area 28 and adjacent to the lead-in area 26, which helps stabilize the (rotating) optical disc 10 during playback and recording. Furthermore, each set of projections 12, 14 are offset, such that any individual second projection 14 lies about midway between rays of an angle formed by the center of the optical disc 10 and two adjacent first projections 12. This latter arrangement should provide a more uniform clearance between the optical disc 10 and any flat surface the disc 10 is placed on. Thus, for a given set of projections (e.g. first set of projections 12), it is often desirable to arrange the projections so that the angular displacement between any two adjacent projections is about $2\lambda/n$, where n is the number of projections belonging to that set. In addition, it is generally desirable to offset the first 12 and second 14 projections so that the angular displacement between adjacent first 12 and second 14 projections is $\pi/n$ radians. In this way the projections' center of mass lies near the optical disc's rotation center (i.e., within its inner periphery).

Figure 8:
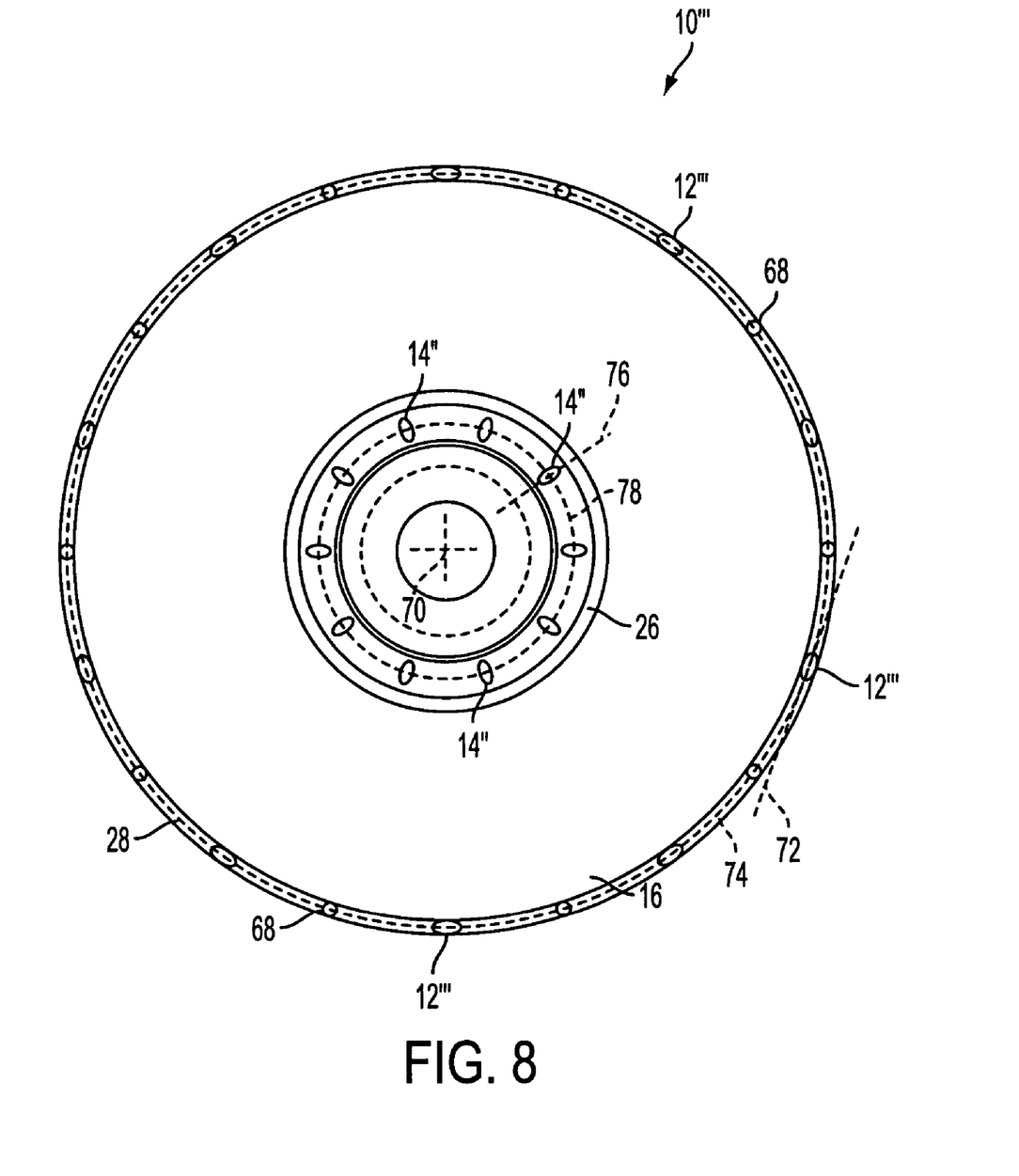
FIG. 8 is a bottom view of another embodiment of an optical disc having projections or embossments that may have different physical characteristics, including shape, height, and orientation.

In other embodiments, the optical disc 10 may include the first set of projections 12, but no second set of projections 14, or may include the second set of projections 14, but no first set of projections 12. In addition, the optical disc 10 may include more than two sets of projections (FIG. 8). The optical disc may employ projections having any desirable shape, including spherical sections, spheroidal sections, ellipsoidal sections, tetrahedrons, quadrahedrons, pentahedrons, hexahedrons, etc. Besides the discrete projections 12, 14 shown in FIG. 1, the optical disc may additionally or alternatively include one or more continuous projections that circumscribe the inner periphery 22 of the optical disc, similar to the stacking ring 32 located adjacent to the clamping region 30. However, the continuous projections are substantially larger than the stacking ring 32, such that when the optical disc 10 is placed on a flat surface, a gap exists between the flat surface and the bottom surface 16 of the optical disc 10.

Although it is usually desirable to locate projections within the predefined non-data areas, the projections or embossments may also be located in areas that are usually reserved for data storage. For example, projections may be located within the data storage area 24 adjacent to the lead-out area 28, as long as the particular optical disc contains no data in that area. This will often be the case when the amount of stored data is less than the optical disc's data storage capacity since CDs and single-layer DVDs encode data in a track that spirals outward from the lead-in 26 area.

In general, the projections may be applied or formed on both the first 16 and second 18 surfaces of the optical disc 10. Since data is read through its first (bottom) surface 16, the optical disc 10 shown in FIG. 1 has no projections located on its second (top) surface 18. However, with double-sided DVDs, data can be read through substantially transparent bottom and top surfaces. Moreover, even if data is only accessed through the bottom surface, minor scratches on the top (label) surface of audio CDs, CD-ROMs, CD-Rs, and CD-RWs may compromise data integrity since the acrylic layer that protects the metallized reflective layer is much thinner than the polycarbonate layer.

Figure 2:
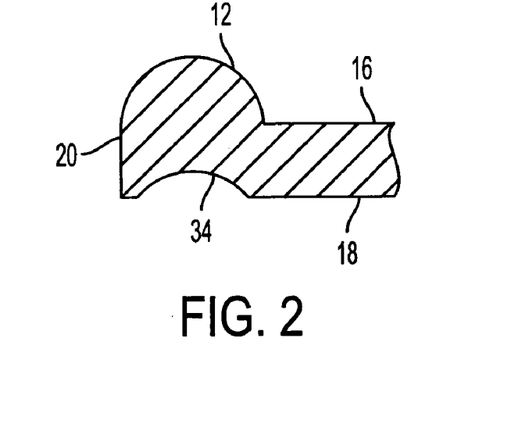
FIG. 2 shows an enlarged partial cross section of the optical disc through section line 2 of FIG. 1.
Figure 3:
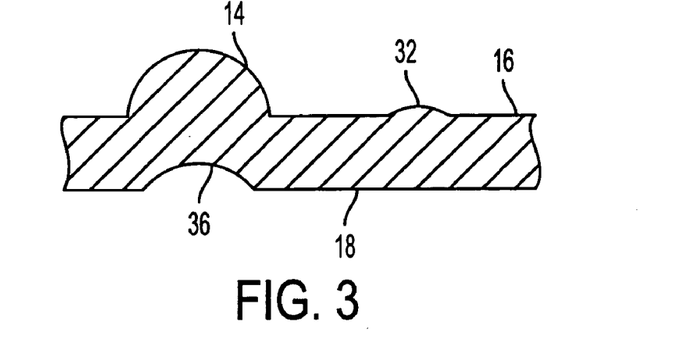
FIG. 3 shows an enlarged partial cross section of the optical disc through section line 3 of FIG. 1.

The optical disc 10 of FIG. 1 has first 34 and second 36 depressions on the second surface 18, which are sized to accommodate the projections 12, 14. As can be seen in FIG. 2 and FIG. 3, which show enlarged partial cross sections of the optical disc 10 through section line 2 and section line 3, respectively, the depressions 34, 36 are located adjacent to the projections 12, 14 and facilitate stacking of optical discs. The height of the projections 12, 14 are greater than the depth of the depressions 34, 36 so that a gap or clearance will exist between adjacent optical discs when stacked. Note, however, that it may be desirable to size the depressions 34, 36 so that the clearance between adjacent optical discs is a small fraction of the optical disc 10 thickness. Also note that the height of the ridge 32 shown in FIG. 3 is substantially less than the height of the projections 14.

Figure 4:
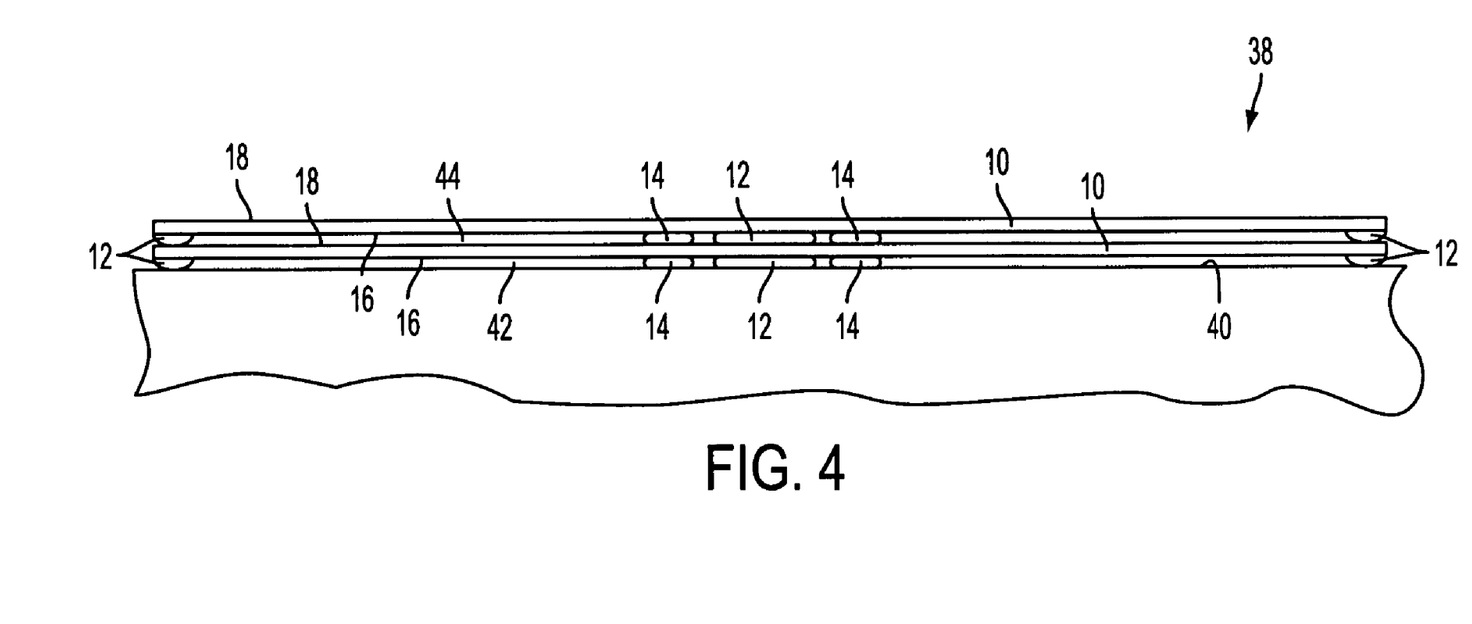
FIG. 4 shows a side view of a stack of two optical discs resting on a flat surface such as a tabletop or desktop.

FIG. 4 shows a side view of a stack 38 of two optical discs 10 resting on a flat surface 40 such as a tabletop or desktop. Although not shown in FIG. 4, the optical discs 10 have depressions 34, 36 such as those shown in FIG. 2 and FIG. 3. The projections 12, 14 and depressions 34, 36 stabilize the stack 38 of optical discs 10 and minimize the relative movement of adjacent optical discs 10 that may damage their surfaces 16, 18. The height of each of the projections 12, 14 shown in FIG. 1 does not vary significantly among projections 12, 14 so that a gap or clearance 42 between the first surface 16 of the optical disc 10 and the flat surface 40 of the tabletop is substantially uniform. Since the depressions 34, 36 are shallower than the height of the projections 12, 14, a gap or clearance 44 between respective first 16 and second 18 surfaces of adjacent optical discs is less than the clearance 42 between the optical disc 10 and the flat surface 40. Nonetheless, the clearance 44 between adjacent optical discs 10 is sufficient to minimize damage to their surfaces 16, 18.

In the embodiment shown in FIG. 4, the heights of individual projections 12, 14 are comparable to the thickness of the optical disc 10 (i.e., about one mm). Generally, however, the projections are sized to provide adequate clearance between the optical disc 10 and the flat surface 40, while minimizing interference between the projections 12, 14 and components of optical disc readers and drives. For compact discs and videodiscs, this corresponds to projection heights less than the thickness of the optical disc, and more typically, to projection heights about half or less than the thickness of standard CDs or DVDs.

Figure 5:
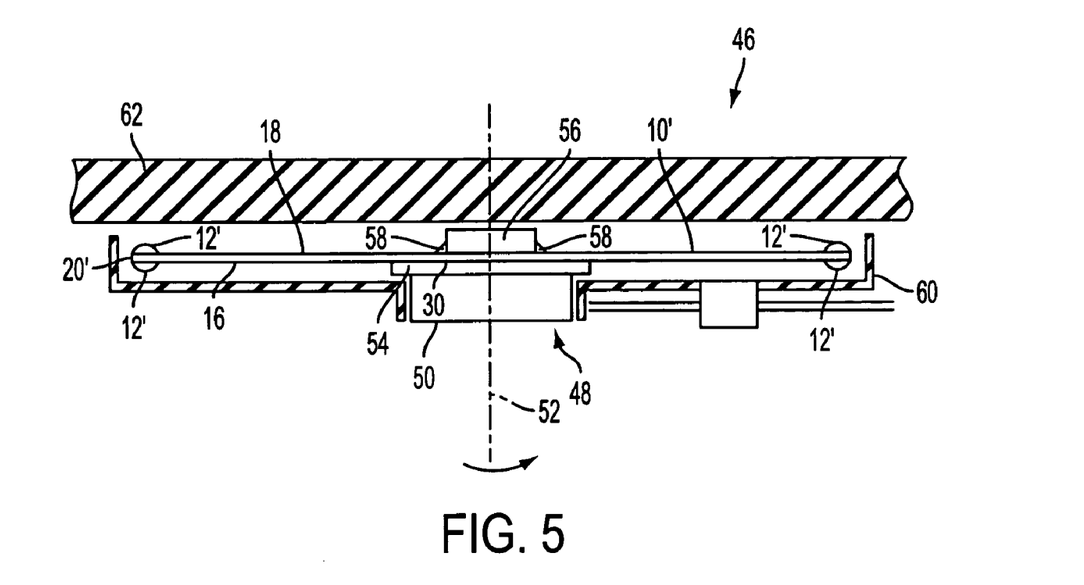
FIG. 5 shows the placement of an optical disc having clearance projections or embossments within a section of an optical disc reader or player.

FIG. 5 shows the placement of an optical disc 10' having clearance projections or embossments within a portion of an optical disc reader 46 (player). The optical disc 10' shown in FIG. 5 includes sets of projections 12' located on both first 16 and second 18 surfaces along the outer periphery 20 of the disc 10'. The optical disc reader 46 includes an optical disc drive 48 comprised of a motor 50 for rotating the optical disc 10' about an axis 52 containing its center, a platen 54, and a cylindrical spindle 56 that is sized to accommodate the inner periphery (not shown) of the optical disc 10'. The disc drive 48 also includes spring-loaded tabs 58 that force the optical disc 10' against the platen 54 at the clamping region 30, thereby securing the optical disc 10' during playback. The optical disc reader 46 also includes a disc cradle 60 and housing 62, which are shown in cross-section for clarity. As can be seen in FIG. 5, the projections 12' are sized to prevent interference with the components optical disc reader 46, including the optical disc drive 48, the disc cradle 60 and the optical reader housing 62.

The projections 12, 12', 14 and depressions 34, 36 shown in FIG. 1-FIG. 5 may be provided in various ways. For example, the projections 12, 12', 14 (and depressions 34, 36) may be formed by injection molding during fabrication of the optical disc 10, 10'. In addition, the projections 12, 12', 14 or embossments may be applied to an optical disc 10, 10' following its fabrication. Useful application methods include adhesive bonding, thermal welding, friction bonding, interference bonding, and the like. In some embodiments, the projections 12, 12', 14 may be applied as thermosetting or thermoplastic liquid polymers that solidify through chemical cross-linking or cooling. In other embodiments, the projections 12, 12', 14 may be applied as decals or similar self-adhesive stock material. When applied after fabrication of the optical disc 10, 10', the projections 12, 12', 14 may be supplied in kits that are applied by users of optical discs.

After market suppliers may also provide the projections 12, 12', 14 by hot stamping. For example, a heated tool (pin, rod, etc.) having the requisite shape may be pressed against the second (top) surface 18 of the optical disc 10 of FIG. 1-FIG. 3, forming depressions 34, 36 and corresponding projections 12, 14 on the second 18 and first (bottom) 16 surfaces, respectively.

Figure 6:
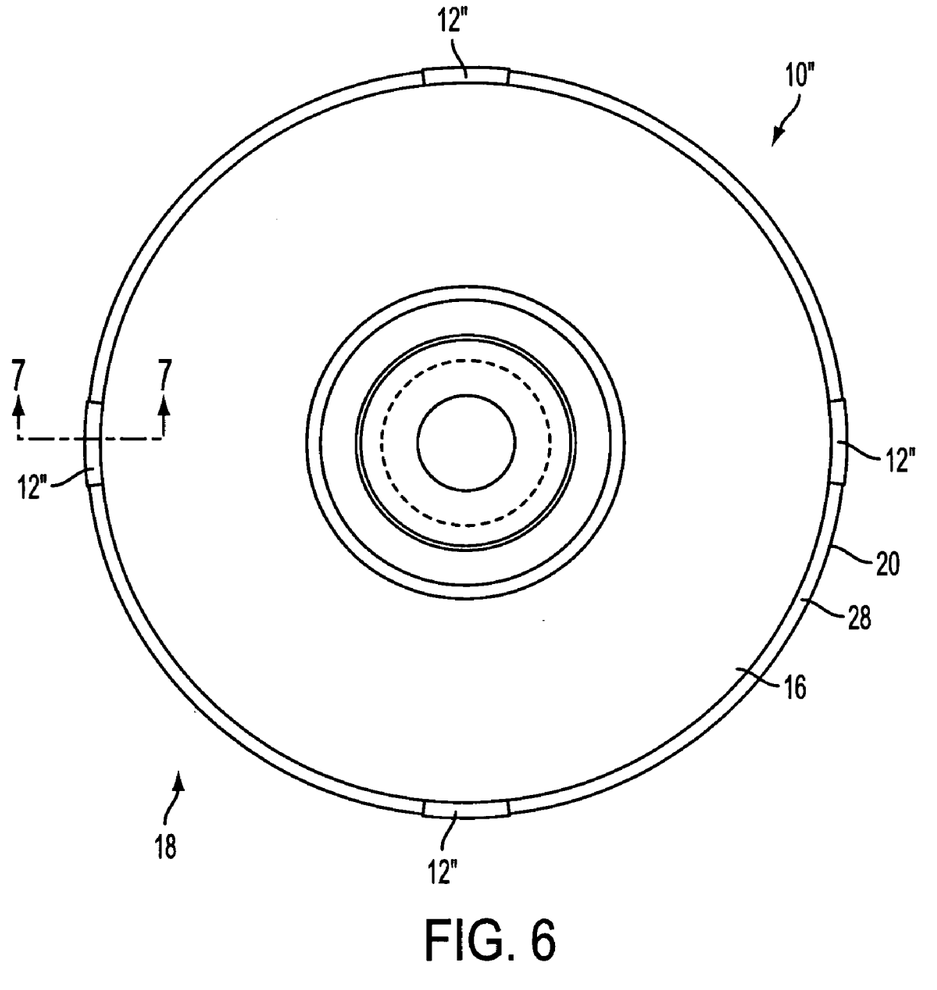
FIG. 6 is a bottom view of an optical disc having projections or embossments that are applied following fabrication of the optical disc.

FIG. 6 is a bottom view of an optical disc 10" having projections 12" or embossments that are applied following fabrication of the optical disc 10". The projections 12" are held in place by an interference fit or friction bonding. Like the projections 12' shown in FIG. 1, the projections 12" are located within the lead-out area 28 of the optical disc 10", but extend slightly outward from disc's outer periphery 20.

Figure 7:
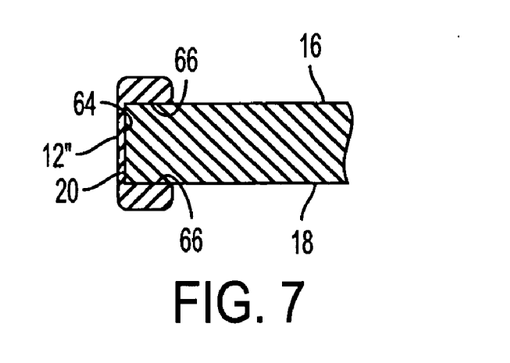
FIG. 7 shows an enlarged partial cross section of the optical disc through section line 7 of FIG. 6.

As shown in FIG. 7, which is an enlarged partial cross section through section line 7 in FIG. 6, the projections 12" are located on both the first 16 and second 18 surfaces of optical disc 10". Each projection 12" is made of a resilient material and contains a slot 64, which is slightly smaller than the thickness of the optical disc 10". To install, individual projections 12" are clipped onto the outer periphery 20 of the optical disc 10" and are held in place by friction between the walls 66 of the slot 64 and the surfaces 16, 18 of the optical disc 10".

Although on a given optical disc 10, 10', 10" the sets of projections 12, 12', 12", 14, 14' shown in FIG. 1 through FIG. 7 have similar shape, height, and orientation, other embodiments may include sets of projections that have different physical characteristics.

For example, FIG. 8 is a bottom view of an optical disc 10''' having first 12''', second 14", and third 68 sets of projections or embossments on the first (bottom) surface 16 of the optical disc 10'''. Like the sets of projections 12, 14 shown in FIG. 1, the first 12''' and second 14" sets of projections are evenly distributed in circular bands within the lead-out area 28 and adjacent to the lead-in area 26, respectively. Additionally, each set of projections 12''', 14" are offset, such that any individual second projection 14" lies about midway between rays of an angle formed by the center 70 of the optical disc 10''' and two adjacent first projections 12'''. Though both sets of projections 12''', 14" are shaped like a section of an ellipsoid, their orientations are different. As can be seen in FIG. 8, each of the first set of projections 12''' has a longitudinal (major) axis 72 that is substantially tangent to a first circle 74 which contains the centers of the first set of projections 12'''. In contrast, each of the second set of projections 14''' has a longitudinal axis 76 that is substantially normal to a second circle 78 which contains the centers of the second set of projections 14'''.

Besides different orientation, the optical disc 10''' includes projections having different heights and shapes. For example, each of the third set of projections 68 is disposed within the lead-out area 28 of the optical disc 10''', about midway between two adjacent first projections 12'''. Unlike the ellipsoidal first 12''' and second 14" sets of projections, each of the third set of projections 68 has the shape of a spherical section. Moreover, though the third set of projections 68 have similar sizes, their heights are substantially less than the heights of the first 12''' and second 14" sets of projections. For example, the first 12''' and second 14" sets of projections may have heights about equal to one half the thickness of a standard CD or DVD (e.g., 0.6 mm). In contrast, the third set of projections 68 may have heights about equal to one quarter the thickness of a standard CD or DVD (e.g., 0.3 mm).

The differences in orientation, shape, and height among the sets of projections 12''', 14", 68 may offer some advantages. For instance, the use of the smaller third set of projections 68 permits greater spacing of the first set of projections 12''' without significantly affecting the protection of the first surface 16. When placed on a substantially flat surface with the optical disc's 10''' first surface 16 facing the flat surface, the third set of projections 68 helps maintain a clearance between the two surfaces—albeit a smaller clearance than the first set of projections 12''' provides. The increased spacing of the first set of projections 12''' and the radial orientation of the second set of projections 14", help minimize interference between slot-loading optical disc readers and drives and the first 12''' and second 14" sets of projections. The projections 12''', 14", 68 may be provided using any of the methods described above. For example, the projections 12''', 14", 68 may be formed by injection molding during fabrication of the optical disc 10''' or may be applied to the optical disc 10''' following its fabrication.

It should be understood that the above description is intended to be illustrative and not limiting. Many embodiments will be apparent to those of skill in the art upon reading the above description. Therefore, the scope of the invention should be determined, not with reference to the above description, but instead with reference to the appended claims, along with the full scope of equivalents to which such claims are entitled. The disclosures of all patents, articles and references, including patent applications and publications, if any, are incorporated herein by reference in their entirety and for all purposes.

What is claimed is:

1. An optical disc that is used to store and retrieve digital data, the optical disc comprising:
    first and second surfaces having inner and outer peripheries, at least the first surface of the optical disc capable of transmitting light;
    an area for storing digital data, the area located between the inner and outer peripheries of the first and second surfaces, the digital data being accessible by shining light through the first surface of the optical disc; and
    one or more projections located on at least the first surface of the optical disc, the one or more projections sized and configured to minimize interference with retrieving the digital data stored on the optical disc and to provide a clearance between the first surface of the optical disc and a substantially flat surface when the optical disc is placed on the substantially flat surface with the first surface of the optical disc facing the substantially flat surface.

2. The optical disc of claim 1, wherein the one or more projections are located on the first surface of the optical disc between the area for storing digital data and the outer periphery of the optical disc.

3. The optical disc of claim 1, wherein the one or more projections are located on the first surface of the optical disc between the area for storing digital data and the inner periphery of the optical disc.

4. The optical disc of claim 1, wherein the one or more projections are located on the first surface of the optical disc between the area for storing digital data and the inner and outer peripheries of the optical disc.

5. The optical disc of claim 1, wherein the one or more projections are located in the area for storing digital data adjacent to the outer periphery of the optical disc.

6. The optical disc of claim 1, wherein the one or more projections are located in predefined non-data areas.

7. The optical disc of claim 1, wherein the one or more projections have heights about less than the optical disc thickness.

8. The optical disc of claim 1, wherein the one or more projections have heights about equal to or less than one half the optical disc thickness.

9. The optical disc of claim 1, wherein the one or more projections are continuous and circumscribe the inner periphery of the optical disc.

10. The optical disc of claim 1, further comprising one or more projections located on the second surface of the optical disc, the one or more projections sized and configured to minimize interference with digital data retrieval and to provide clearance between the second surface of the optical disc and a substantially flat surface when the optical disc is placed on the substantially flat surface with the second surface of the optical disc facing the substantially flat surface.

11. A system for protecting an optical disc that is used to store and retrieve digital data, the system comprising one or more projections for applying to a surface of an optical disc, the one or more projections sized and configured to minimize interference with digital data retrieval and to provide a clearance between the surface of the optical disc and a substantially flat surface when the optical disc is placed on the substantially flat surface with the surface of the optical disc facing the substantially flat surface.

12. The system of claim 11, wherein the one or more projections are continuous and circumscribes an interior periphery of the optical disc.

13. A method of protecting an optical disc used to store and retrieve digital data, the method comprising:

providing one or more projections on at least a first surface of an optical disc, the one or more projections sized and configured to prevent interference with digital data retrieval and to provide a clearance between the first surface of the optical disc and a substantially flat surface when the optical disc is placed on the substantially flat surface with the first surface of the optical disc facing the substantially flat surface.

14. The method of claim 13, further comprising forming the projections on the first surface of the optical disc by injection molding.

15. The method of claim 13, further comprising applying the projections on the first surface of the optical disc by bonding.

16. The method of claim 13, further comprising forming the projections on the first surface of the optical disc by hot stamping.

17. The method of claim 13, further comprising providing the projections on a second surface of the optical disc.

18. The method of claim 13, further comprising forming depressions in a second surface of the optical disc by injection molding.

* * * * *